United States Patent [19]
Mullenberg

[11] 3,958,888
[45] May 25, 1976

[54] CLAMPING ASSEMBLY

[76] Inventor: Ralph Mullenberg, Nelkenstrasse 6, 4041 Hulchrath, Germany

[22] Filed: May 17, 1974

[21] Appl. No.: 471,156

[30] Foreign Application Priority Data
May 17, 1973 Germany............................ 2324916
July 13, 1973 Germany............................ 2329940

[52] U.S. Cl................................... 403/13; 403/370
[51] Int. Cl.².......................................... F16D 1/06
[58] Field of Search ............ 403/370, 371, 369, 16, 403/13

[56] References Cited
UNITED STATES PATENTS
| | | | |
|---|---|---|---|
| 2,460,631 | 2/1949 | Fawick.................................. | 403/16 |
| 3,279,870 | 10/1966 | Janiszewski..................... | 403/334 X |
| 3,501,183 | 3/1970 | Stratienko........................... | 403/370 |
| 3,717,367 | 2/1973 | Peter et al. ........................ | 403/366 |
| 3,782,841 | 1/1974 | Winckelhaus................... | 403/370 X |

FOREIGN PATENTS OR APPLICATIONS
| | | | |
|---|---|---|---|
| 1,217,074 | 12/1970 | United Kingdom................. | 403/374 |
| 1,095,064 | 1/1965 | Germany ............................ | 403/370 |

*Primary Examiner*—Andrew V. Kundrat
*Attorney, Agent, or Firm*—Bacon & Thomas

[57] ABSTRACT

A clamping assembly mounting a cylindrically bored hub onto a shaft in which a double-taper ring and two self-locking tapered clamping sleeves are clamped together by means of axially oriented clamping bolts, the double-taper ring having a peripheral collar between the clamping sleeves for engagement by the clamping bolt, when the sleeves are to be unclamped from the double-taper ring.

6 Claims, 9 Drawing Figures

CLAMPING ASSEMBLY

BACKGROUND OF THE INVENTION

1. Field of the Invention

The invention relates to a clamping assembly for the attachment of an outer member, especially a hub with a cylindrical cavity, to a concentrically received, outwardly cylindrical inner member, especially a shaft, by means of a double-taper ring having one cylindrical peripheral surface and two oppositely slanting tapered peripheral surface portions, the maximum wall thickness of the ring being located axially in the mid-portion of the double-taper ring, the assembly including two cooperating tapered clamping sleeves with axially aligned cylindrical peripheral surfaces and oppositely tapered surfaces seated on the tapered surface portions of the double-taper ring, the assembly being clampable by means of axially oriented clamping bolts.

Tightening of the assembly by means of the clamping bolts causes the tapered clamping sleeves to engage the double-taper ring in a wedge action, thereby contracting the inner clamping element, while expanding the outer clamping element, or elements, as the case may be, and creating a clamping action between the cylindrical surface of the double-taper ring and either the shaft or the hub on the one hand, and between the cylindrical peripheral surfaces of the clamping sleeves and either the hub bore or the shaft, respectively, on the other hand, the clamping assembly creating considerable radial forces. The double-taper ring of this assembly may thus either constitute the outer clamping element with inwardly facing tapered surfaces, or the inner clamping element with outwardly facing tapered surfaces.

2. Description of the Prior Art

A clamping assembly of the general kind mentioned above is known from German Pat. No. 1,095,064. However, the double-taper ring disclosed therein consists of several separate rings. It takes the form of a thin-walled inner ring which cooperates with two thick-walled tapered outer clamping sleeves having axial bores for the clamping bolts, the latter being arranged radially outside the double-taper ring, reaching from one tapered clamping sleeve into the other.

The wedge action of this type of clamping assembly is primarily determined by the angle of taper of the tapered surfaces: a smaller angle of taper, i.e. a slimmer axial cone, creates a larger radial clamping force component, when the assembly is tightened. Accordingly, the radial preload and the maximum torque which can be transmitted with a given strength limit of the clamping bolts increases with a decreasing angle of taper.

The reduction of the taper angle on the tapered clamping surfaces finds a lower limit, however, where the axial displacement of the clamping sleeves under tightening of the clamping bolts requires excessive axial displacement of the former towards each other.

It has now been found that angles of taper which, under the above considerations, are still practical and which are desirable from the standpoint of obtaining a high torque-transmitting capability, fall within the range of self-locking engagement of the tapered surfaces. With the cooperating elements made of steel, this range begins at about 7° of taper angle, measured between the tapered surface and the assembly axis. When the taper angle is chosen less than this value, the tapered surfaces lock themselves against each other so that, even after the clamping bolts are removed from the assembly, these surfaces reamin under clamping tension and cannot be disengaged freely, i.e. not without a forcible displacement of the clamping elements in the direction opposite to the clamping action of the clamping bolts.

If in the aforementioned prior art clamping assembly according to German Pat. No. 1,095,064, the tapered clamping surfaces have a taper angle lying within the range of self-locking tapers, then, the particular assembly cannot be disengaged. Even in the case where ring extracting screws are added, as in the case of the German Published Allowed Application (Auslegeschrift) No. 1,190,266, the latter are capable only of loosening one of the tapered clamping sleeves, namely the one which becomes loose first, while the other tapered clamping sleeves cannot be stripped from the double-taper ring, because there is no longer a counter-support for the stripping screws.

SUMMARY OF THE INVENTION

Underlying the present invention is the objective of devising a clamping assembly of the earlier-mentioned kind which is so designed that, after clamping for maximum torque-transmitting capability, both clamping sleeves can again be unclamped without the aide of special auxiliary tools.

This objective is attained in accordance with the present invention, by choosing the angle of taper to fall within the range of self-locking engagement and by providing a mid-portion of the double-taper ring between the tapered clamping sleeves which extends radially into the range of the axial clamping bolts.

This peripheral wall extension provides an abutment support for the application of axial unclamping forces between the clamping sleeves and the double-taper ring which are necessary for separately removing each clamping sleeve from the double-taper ring.

In a preferred embodiment of the invention, this peripheral wall extension is located on the same radial side as the tapered surfaces of the double-taper ring, being arranged axially between the latter surfaces, in the form of a peripheral collar.

In addition to its primary purpose of serving as a ring unclamping support, the peripheral collar of the double-taper ring also serves to reinforce the latter in such a way that its longitudinal portion located between the tapered clamping sleeves will likewise transmit considerable radial pressures, so that the corresponding cylindrical surface area of the double-taper ring serves as a supplemental pressure surface. This feature permits either a reduction of the compression stress under condition of unchanged transmitted torque, or the transmission of additional torque under unchanged compression stress. It is of advantage, if the peripheral collar occupies the major portion of the axial distance between the clamping sleeves, when the latter are clamped, in which case its reinforcing feature is optimally utilized.

The preferred embodiment of the invention is characterized in that the peripheral wall portions which extend radially into the engagement range of the clamping bolts connecting the clamping sleeves include axial bores for the clamping bolts that other angular portions of the radially extending peripheral wall portions define a bore-free face, in alignment with threaded bores in the respective tapered clamping sleeve situated on the side of the heads of the clamping bolts, and that in still other angular portions of the radially extending peripheral wall portions are arranged threaded bores, in alignment with angular bore-free portions in the clamping sleeve situated opposite the bolt heads and the clamping sleeve situated on the side of the clamping bolt heads has aligned through-bores.

In this embodiment of the invention, it is possible to selectively unclamp the one or the other of the two clamping sleeves from the double-taper ring. When it is desired to strip the clamping sleeve situated on the side of the clamping screw heads, extracting bolts are threaded into the threaded bores of that clamping sleeve, until they engage the aligned bore-free angular portions of the peripheral wall extension, the latter thereby serving as an abutment collar on the double-taper ring. If it is desired to unclamp the clamping sleeve situated opposite the clamping bolt heads, extracting bolts are inserted into the through-bores of the clamping sleeve situated near the bolt heads and advanced through the threaded bores of the peripheral wall extensions, or peripheral collar, until they engage the earlier-mentioned bore-free angular portions of the tapered clamping sleeve situated on the side opposite the clamping bolt heads, thereby pushing the clamping sleeve away from the double-taper ring.

Normally, no radial force transmission takes place within the axial range of the peripheral collar. However, in a clamping assembly where the double-taper ring is the inner element, it is also possible to utilize the axial range of the peripheral collar for a direct radial transmission of clamping forces, if the radially extending peripheral collar is provided on its outer circumferential surface with a second double-taper which narrows in both axial directions, and if the clamping sleeves have matching axial extensions facing toward the peripheral collar, whereby the outer surfaces of these axial extensions are in alignment with the cylindrical outer surfaces of the clamping sleeves and their inner surfaces engage the tapered surfaces of the double-taper on the peripheral collar.

Tightening of this clamping assembly brings the tapered surfaces of the peripheral collar into wedging action with the tapered axial extensions of the clamping sleeves, thereby improving the clamping action between the clamping elements.

An important feature of the clamping assembly of the invention is its capability of centering the bore of the outer member in relation to the cylindrical outer surface of the inner member. Commonly, clamping assemblies of the type here suggested would be used in conjunction with the mounting of rather heavy machine components. Thus, if for instance, a heavy drum is to be clamped onto a shaft and the clamping assembly is still loose, the drum will, because of its weight, tend to sit on the shaft, meaning that it will no longer be exactly concentric with the shaft. It then becomes necessary to take special precautions during tightening of the clamping assembly, in order to lift the drum and to reestablish its concentric position on the shaft, so as to avoid the creation of eccentricity.

This problem can be solved in a simplified way, with the help of a particular embodiment of the invention in which the diameter of the peripheral collar is made to correspond substantially to the diameter of the cylindrical surface of the other principal member.

Thus, in the loosely assembled, not yet tightened condition, the cylindrical surface of the double-taper ring engages one of the two members, while the cylindrical peripheral surface of its peripheral collar engages the cylindrical surface of the other member, thereby maintaining both members in a concentric position relative to each other, through the action of the double-taper ring alone, tightening of the two clamping sleeves thereby providing only the clamping action, since the centered position of the two members is already established. Depending upon whether the double-taper ring is the inner element or the outer element of the assembly, the cylindrical peripheral surface of the peripheral collar may form part of the bore of the outer element, or a cylindrical outer surface of the inner element.

Among embodiments of the present invention, in which the double-taper ring is the outer element, one particular embodiment features a double-taper ring which does not have a longitudinal slit, but has a comparatively heavy cross section in relation to the radial compression forces acting on the clamping sleeves.

The missing slit enables the outer double-taper ring to sustain high annulus tension stress. In this case, the cross section of the double-taper ring is intended to be so strong that it is capable of producing the necessary radial clamping forces for the clamping of the shaft inside the hub, without the ring itself requiring radial support inside a bore. A very advantageous application for such a clamping assembly is present in connection with a tubular hub which directly engages the shaft and which in turn is surrounded by the clamping assembly. Tightening of this clamping assembly causes the hub to be compressed radially inwardly, thereby clamping it to the shaft. The counter-support is provided by the double-taper ring which is thereby subjected to annulus tension stress. In this case, the two tapered clamping sleeves which have to yield radially inwardly, would normally be slitted. For an assembly in which these sleeves remain without a slit, the cross section of the double-taper ring would accordingly have to be especially heavy — in any case, at least heavier than the sum of the cross-sectional areas of the tapered clamping sleeves. This particular embodiment of the clamping assembly of the invention may also be used for the coupling of two shaft ends, whereby one of the clamping sleeves engages one of the shaft ends, and the other clamping sleeve engages the other shaft end.

DESCRIPTION OF THE DRAWINGS

The drawing illustrates several embodiments of the invention.

DESCRIPTION OF THE PREFERRED EMBODIMENTS

Figures 1, 2:
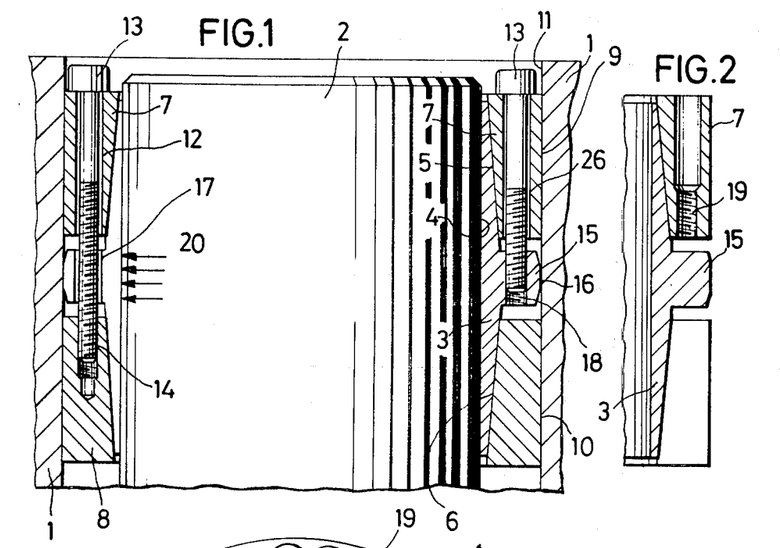
FIG. 1 shows in a longitudinal cross section a first embodiment of the invention, the section being taken along line I—I of FIG. 3.
FIG. 2 shows a partial longitudinal cross section taken along line II—II of FIG. 3.

In FIG. 1 is illustrated a clamping assembly by means of which a hub 1 can be clamped onto a shaft 2. The clamping assembly comprises a double-taper ring 3 which, in the embodiment illustrate, constitutes the inner clamping element and has a cylindrical inner surface 4 with which the double-taper ring 3 is seated on the shaft 2. On its outer side the double-taper ring 3 has two oppositely slanting tapered surfaces 5 and 6, the angle of taper against the assembly axis being inside the range of self-locking engagement, i.e. generally below about 7 degrees. On the tapered surfaces 5 and 6 are seated tapered clamping sleeves 7 and 8, respectively, which sleeves have appropriately tapered inner surfaces bearing against the tapered surfaces 5 and 6, the outer surfaces 9 and 10 of the clamping sleeves 7 and 8 being cylindrical and engaging the bore 11 of hub 1.

The clamping sleeve 7 has a number of peripherally closely spaced axial bores 12 inside which are accomodated axial clamping bolts 13. These clamping bolts 13 engage threaded bores 14 in the clamping sleeve 8. When the clamping bolts 13 are tightened, they pull the clamping sleeves 7 and 8 onto the double-taper ring 3, thereby creating a radial clamping action and a firm frictional connection between the hub 1 and the shaft 2.

The double-taper ring 3, as a result of the particular arrangement of its tapered surfaces 5 and 6, has its greatest wall thickness in its mid-portion. In this portion, however, the double-taper ring 3 is further provided with an integrally connected radially extending peripheral collar 15 which is positioned between the clamping sleeves 7 and 8 and which, with its cylindrical peripheral surface 16, engages the bore 11 of hub 1. The peripheral collar 15 is of substantial width, so that it occupies the major portion of the axial space between the clamping sleeves 7 and 8 in the clamped configuration of the assembly. The peripheral collar 15 is provided with through-bores 17 for the clamping bolts 13. In addition to these through-bores, the peripheral collar 15 also has regularly spaced threaded bores 18 (see FIG. 3), in places where the clamping sleeve 8 has no threaded bores 14. On a similarly small number of places along its periphery, the clamping sleeve 7 is further provided with threaded bores 19 which are in alignment with places on the peripheral collar 15 where the latter does not have through-bores 17.

Into the threaded bores 18 can be screwed from the side of the tapered clamping sleeve 7 a number of extracting bolts which abut against the end face of the tapered clamping sleeve 8, thereby serving to remove the latter from the double-taper ring 3. Similarly, a number of extracting screws can be engaged in the threaded bores 19 of the clamping sleeve 7 so that they engage the end face of the peripheral collar 15, thereby unclamping the clamping sleeve 7 from the double-taper ring 3. For tightening purposes, however, shorter bolts are screwed into the threaded bores 18, as can be seen in FIG. 1; these bolts then serve to augment the clamping engagement of the tapered clamping sleeve 7 on the double-taper ring 3.

The integral peripheral collar 15 on the double-taper ring 3 provides a reinforcement effect on the latter in its mid-portion between the tapered clamping sleeves 7 and 8 so that clamping pressure against the shaft 2 is also provided in the axial area between the clamping sleeves 7 and 8, as is implied by the arrows 20 in FIG. 1. Thus, even though the illustrated double-taper ring 3 is relatively thin-walled, its mid-portion contributes to the clamping effect. Furthermore, the double-taper ring 3, by engaging with its inner periphery the shaft 2, and by also engaging with its outer periphery 16 of the bore 11 of hub 1, also provides a centering effect. The parts are so fitted together at the periphery 16 that axial displacement of the clamping assembly inside the bore 11 is possible, but any substantial radial dislocation of the shaft 2 in relation to the hub 1 is prevented.

Because the clamping bolts 13 reach through the bores 17 of the peripheral collar 15, they also provide an angular positioning of the clamping sleeves 7 and 8 in relation to the double-taper ring 3, thereby preventing any possible shifting in the circumferential direction.

Figure 4:
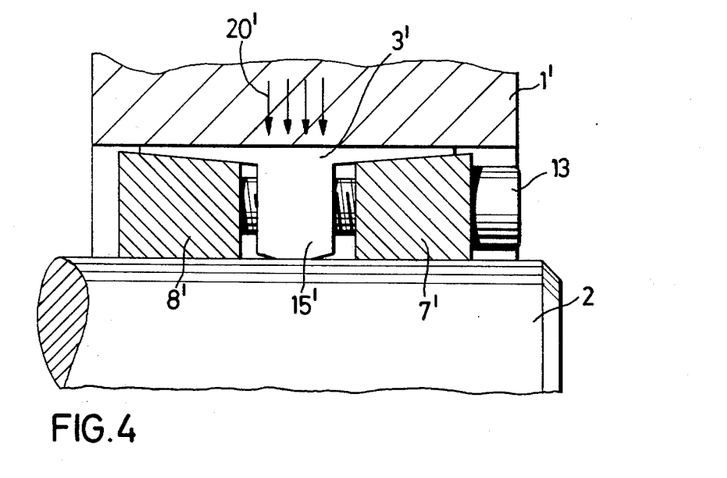
FIG. 4 is a partial longitudinal cross section through a second embodiment of the invention.

In the embodiment illustrated in FIG. 4, the double-taper ring 3' constitutes the outer element, while the tapered clamping sleeves 7' and 8' are seated on the shaft 2. In this embodiment it is very important that the circumferential collar 15' provides an increase in the clamping area of the double-taper ring 3' inside hub 1 and that the double-taper ring 3' transmits torque also in the central region indicated by the arrows 20'. This feature makes it possible to reduce the compression stress on the cylindrical outer surface of the double-taper ring 3', permitting a corresponding reduction in the overall dimensions of hub 1.

Figure 5:
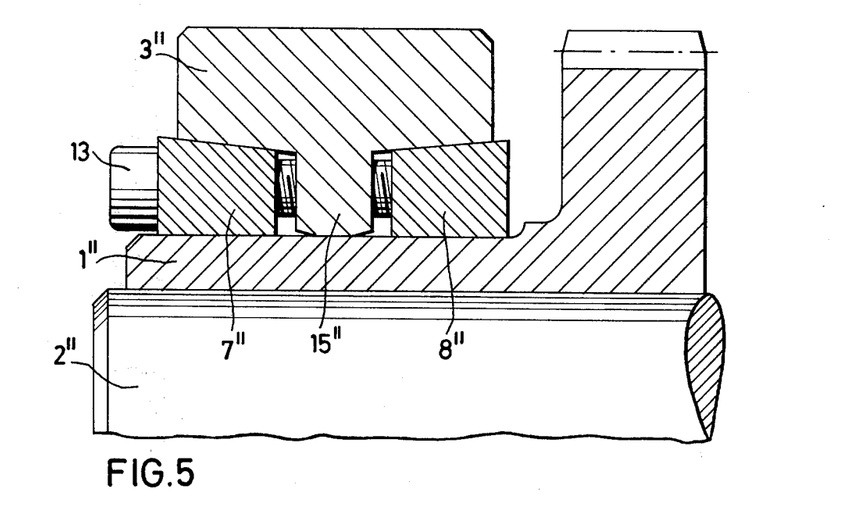
FIG. 5 is a similar longitudinal cross section through a third embodiment of the invention.

In the embodiment of FIG. 5 the double-taper ring 3'' is again the outer clamping element. In this case it is provided with a heavy cross section, because the clamping sleeves 7'' and 8'' are seated on the outside of a hub 1'' which is clamped onto a shaft 2 through radial compression. The necessary clamping forces are generated as a result of annulus tension stress created in the double-taper ring 3''. Because in this case, too, the peripheral collar 15'' supports some of the radial clamping forces, the outer diameter of the double-taper ring 3'' may be reduced correspondingly.

Figures 6, 7:
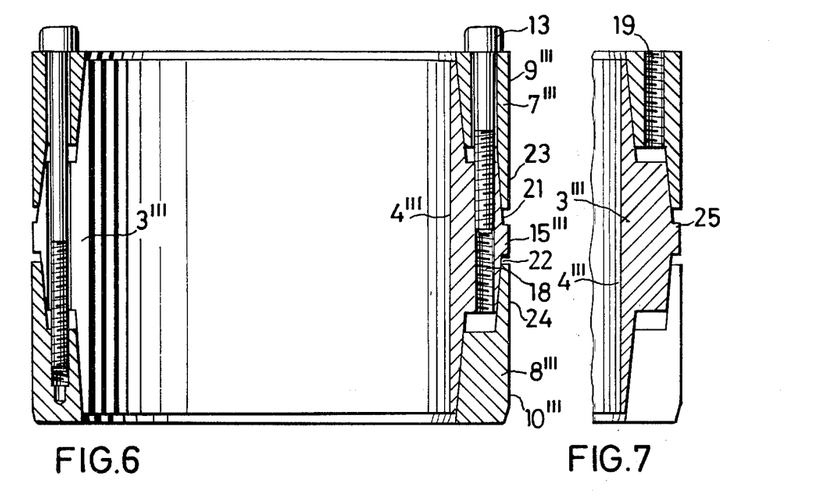
FIGS. 6 and 7 are two representations similar to FIGS. 1 and 2, showing of a fourth embodiment of the invention.

In the embodiment illustrated in FIGS. 6 and 7 the double-taper ring 3''' is again the inner clamping element. The collar 15''' has on its outer periphery axially inwardly slanting tapered surfaces 21 and 22 which are engaged by axial extensions 23 and 24 of the clamping sleeves 7''' and 8''', respectively. The cylindrical outer surfaces of the axial extensions 23 and 24 continue into the cylindrical outer surfaces 9''' and 10''' of the clamping sleeves 7''' and 8'''. The inner peripheral surfaces of the axial extensions 23 and 24 are tapered surfaces which engage the tapered surfaces 21 and 22 of the peripheral collar 15'''. Thus, a direct radial force flow is obtained with this embodiment also in the region of the peripheral collar 15'''.

The peripheral collar 15''' further includes an outer collar portion 25 positioned between the axial extensions 23 and 24, the collar portion 25 engaging the bore of the outer member, thereby providing a centering effect between the outer and inner principal members.

Figure 8:
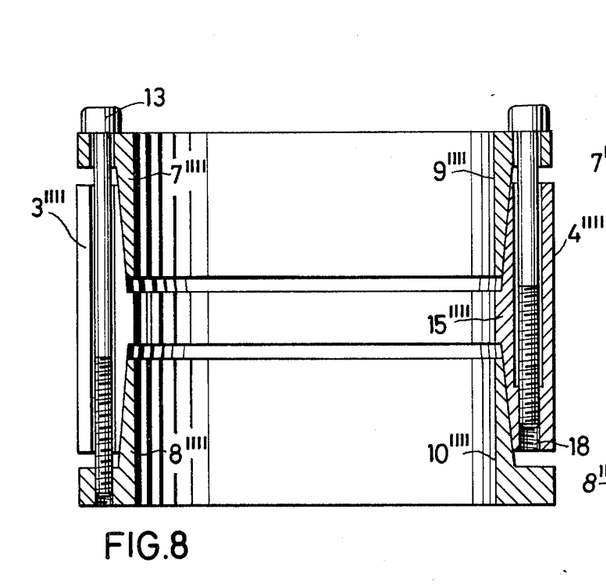
FIGS. 8 and 9 are likewise two representations similar to FIGS. 1 and 2 and show a fifth embodiment of the invention.
Figure 9:
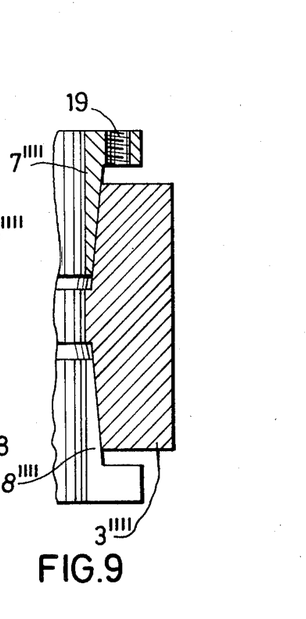

In the embodiment of FIGS. 8 and 9, the clamping sleeves 7'''' and 8'''' have the shape of flanged bushings, the double-taper ring 3'''' being the outer clamping element. In this case, the double-taper ring 3'''' itself extends radially into the area of the clamping bolts 13. It thereby offers the possibility of separately unclamping the clamping sleeves 7'''' and 8'''' in the same manner as was possible with the help of the peripheral collars of the previously described embodiments. The clamping assembly of FIG. 8 serves for the attachment of a shaft to a hub; in this case the cylindrical inner surfaces 9'''' and 10'''' of the clamping sleeves 7'''' and 8'''' engage the shaft, while the cylindrical outer surface 4'''' of the double-taper ring 3'''' engages the bore.

In FIG. 9 is shown a modified embodiment in which the double-taper ring 3''''' has a particularly heavy cross section. This embodiment may be used in the case where two shaft ends are to be coupled together, one shaft end being engaged by the clamping sleeve 7''''', the other shaft end being engaged inside the clamping sleeve 8''''', and the double-taper ring 3''''' serving as the coupling member.

Figure 3:
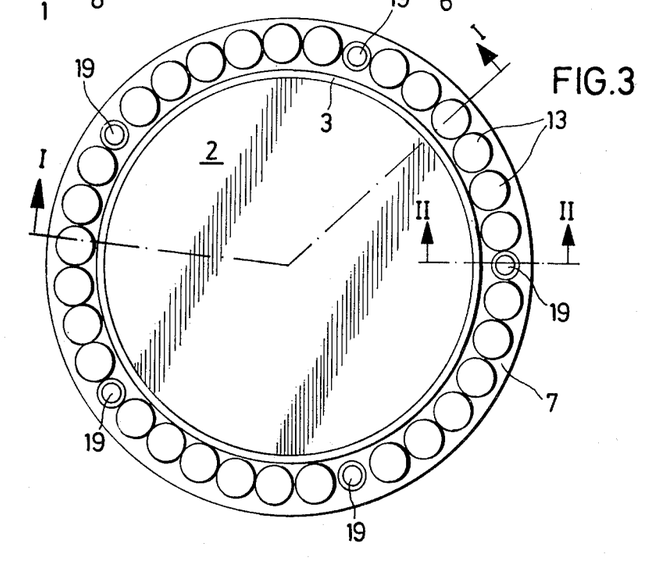
FIG. 3 shows the embodiment of FIG. 1 in an end view from the top of FIG. 1.

As far as the centering effect, the unclamping procedure, and the angular positioning of the clamping sleeves relative to each other are concerned, the embodiments of FIG. 4 through FIG. 9 are analogous to the embodiment of FIGS. 1–3.

In certain of the figures are shown some of the clamping elements without cross-hatching. This is to indicate that these particular tapered clamping elements may optionally be slit in the longitudinal direction.

I claim:

1. A clamping assembly for clampingly connecting together an outer member or hub, having a bore with a cylindrical clamping surface, and an inner member or shaft receivable within said bore and having a clamping surface concentrically spaced from said bore clamping surface, the clamping assembly comprising:
    a double-taper ring having concentric inner and outer peripheral surfaces, one of its peripheral surfaces being cylindrical and adapted for engagement with the clamping surface of one of the two members, the opposite peripheral surface including two oppositely slanting tapered surfaces, the tapers of said surfaces being so slanted that the ring has a maximum wall thickness in its mid-portion;
    two clamping sleeves spaced apart axially and having concentric inner and outer peripheral surfaces, one pair of peripheral surfaces being tapered surfaces adapted to be seated against the tapered surfaces of the double-taper ring, the opposite pair of peripheral surfaces being cylindrical and adapted for engagement with the clamping surface of the other one of the two members;
    the double-taper ring including in the space between the clamping sleeves an integral centering collar extending to the same diameter as the cylindrical peripheral surfaces of the clamping sleeves when said sleeves are in their clamped state, the double-taper ring thereby serving as a centering means between the hub member and the shaft member, when the assembly is in its unclamped state;
    the assembled double-taper ring and clamping sleeves thus defining a package with concentrically spaced inner and outer cylindrical outlines;
    a plurality of clamping bolts spaced along the circumference of the assembly and extending axially between the two clamping sleeves within said inner and outer outlines of the assembly, the clamping bolts reaching through one of the clamping sleeves, through a centrally located wall portion of the double-taper ring, and at least a distance into the second clamping sleeve so as to axially advance the sleeves against one another and onto the tapered surfaces of the double-taper ring, when tightened;
    the angle of taper of the cooperating tapered surfaces of the double-taper ring and the clamping sleeves being at an angle at which the clamping engagement between said tapered surfaces is of the self-locking type, the clamped parts being separable by force only; and
    means for forcibly unclamping each clamping sleeve from the double-taper ring by engaging its centrally located wall portion.

2. A clamping assembly as defined in claim 1, wherein:
    the axes of the clamping bolts extend axially between the inner and outer peripheral surfaces of the two clamping sleeves; and
    the centrally located wall portion of the double-taper ring which is traversed by the clamping bolts is a radial wall extension located axially between the clamping sleeves.

3. A clamping assembly as defined in claim 1, wherein
    along the circumference of the clamping assembly is defined:
    a first series of angularly spaced bolt axes, along each of which at least one clamping sleeve and the double-taper ring have throughbores for said clamping bolts engaging the clamping sleeves;
    a second series of angularly spaced bolt axes along each of which one clamping sleeve has a threaded bore and the double-taper ring has an abutment surface; and
    the unclamping means includes threaded bolts which are engageable through the threaded bores against the abutment surfaces of the double-taper ring so as to unclamp said clamping sleeve from the double-taper ring.

4. A clamping assembly for clampingly connecting together an outer member or hub, having a bore with a cylindrical clamping surface, and an inner member of shaft receivable within said bore and having a clamping surface concentrically spaced from said bore clamping surface, the clamping assembly comprising:
    a double-taper ring having concentric inner and outer peripheral surfaces, one of its peripheral surfaces being cylindrical and adapted for engagement with the clamping surface of one of the two members, the opposite peripheral surface including two oppositely slanting tapered surfaces, the tapers of said surfaces being so slanted that the ring has a maximum wall thickness in its mid-portion;
    two clamping sleeves having concentric inner and outer peripheral surfaces, one pair of peripheral surfaces being tapered surfaces adapted to be seated against the tapered surfaces of the double-taper ring, the opposite pair of peripherial surfaces being cylindrical and adapted for engagement with the clamping surface of the other one of the two members; the assembled double-taper ring and clamping sleeves thus defining a package with concentrically spaced inner and outer cylindrical outlines;
    a plurality of clamping bolts spaced along the circumference of the assembly and extending axially between the two clamping sleeves, within said inner and outer outlines of the assembly; and between the cylindrical and tapered peripheral surfaces of the double-taper ring;
    each clamping sleeve including a radial wall extension located axially outside the double-taper ring and reaching across the clamping bolt axes, the clamping bolts reaching through the wall extension of one of the clamping sleeves, through a centrally located wall portion of the double-taper ring, and at least a distance into the wall extension of the second clamping sleeve so as to axially advance the sleeves against one another and onto the tapered surfaces of the double-taper ring, when tightened; and means for forcibly unclamping each clamping sleeve from the double-taper ring by engaging its centrally located wall portion.

5. A clamping assembly for clampingly connecting together an outer member or hub, having a bore with a cylindrical clamping surface, and an inner member or shaft receivable within said bore and having a clamping surface concentrically spaced from said bore clamping surface, the clamping assembly comprising:

a double-taper ring having concentric inner and outer peripheral surfaces, one of its peripheral surfaces being cylindrical and adapted for engagement with the clamping surface of one of the two members, the opposite peripheral surface including two oppositely slanting tapered surfaces, the tapers of said surfaces being so slanted that the ring has a maximum wall thickness in its mid-portion;

two clamping sleeves having concentric inner and outer peripheral surfaces, one pair of peripheral surfaces being tapered surfaces adapted to be seated against the tapered surfaces of the double-taper ring, the opposite pair of peripheral surfaces being cylindrical and adapted for engagement with the clamping surface of the other one of the two members; the assembled double-taper ring and clamping sleeves thus defining a package with concentrically spaced inner and outer cylindrical outlines;

a plurality of clamping bolts spaced along the circumference of the assembly and extending axially between the two clamping sleeves within said inner and outer outlines of the assembly, the clamping bolts reaching through one of the clamping sleeves, through a centrally located wall portion of the double-taper ring, and at least a distance into the second clamping sleeve so as to axially advance the sleeves against one another and onto the tapered surfaces of the double-taper ring, when tightened;

the cooperating tapered clamping surfaces of the double-taper ring and of the two tapered clamping sleeves each including two axially adjacent, radially parallelly offset tapered surface portions; and the axes of the clamping bolts extending through the assembly at such a radius and the pairs of tapered surface portions being radially offset such a distance, that one pair of tapered surface portions extends radially inside the clamping bolts while the other pair extends radially outside the clamping bolts; and means for forcibly unclamping each clamping sleeve from the double-taper ring by engaging its centrally located wall portion.

6. A clamping assembly for clampingly connecting together an outer member or hub, having a bore with a cylindrical clamping surface, and an inner member or shaft receivable within said bore and having a clamping surface concentrically spaced from said bore clamping surface, the clamping assembly comprising:

a double-taper ring having concentric inner and outer peripheral surfaces, one of its peripheral surfaces being cylindrical and adapted for engagement with the clamping surface of one of the two members, the opposite peripheral surface including two oppositely slanting tapered surfaces, the tapers of said surfaces being so slanted that the ring has a maximum wall thickness in its mid-portion;

two clamping sleeves having concentric inner and outer peripheral surfaces, one pair of peripheral surfaces being tapered surfaces adapted to be seated against the tapered surfaces of the double-taper ring, the opposite pair of peripheral surfaces being cylindrical and adapted for engagement with the clamping surface of the other one of the two members; the assembled double-taper ring and clamping sleeves thus defining a package with concentrically spaced inner and outer cylindrical outlines;

along the circumference of the clamping assembly is defined:

a first series of angularly spaced bolt axes, along each of which one clamping sleeve and the double-taper ring have throughbores and the second clamping sleeve has threaded bores; and a clamping means including a plurality of threaded bolts extending axially between the two clamping sleeves within said inner and outer outlines of the assembly, and engageable through said throughbore of one of the clamping sleeves, through a centrally located wall portion of the double-taper ring, and at least a distance into the threaded bore of the second clamping sleeve so as to axially advance the sleeves against one another and onto the tapered surfaces of the double-taper ring, when tightened;

means for forcibly unclamping each clamping sleeve from the double-taper ring by engaging its centrally located wall portion;

along said circumference is further defined:

a second series of angularly spaced bolt axes along each of which one clamping sleeve has a threaded bore and the double-taper ring has an abutment surface; and the unclamping means includes threaded bolts which are engageable through the threaded bores against the abutment surfaces of the double-taper ring so as to unclamp said clamping sleeve from the double-taper ring;

along said circumference is still further defined:

a third series of angularly spaced bolt axes along each of which one clamping sleeve has a throughbore, the doubletaper ring has a threaded bore, and the other clamping sleeve has an abutment surface; and the unclamping means includes threaded bolts which are engageable through said aligned throughbores and threaded bores against the abutment surfaces of said clamping sleeve so as to unclamp the latter from the double-taper ring.

* * * * *

REEXAMINATION CERTIFICATE (628th)

United States Patent [19]

Mullenberg

[11] B1 3,958,888

[45] Certificate Issued  Feb. 3, 1987

[54] CLAMPING ASSEMBLY

[76] Inventor: Ralph Mullenberg, Nelkenstrasse 6, 4041 Hulchrath, Fed. Rep. of Germany

Reexamination Request:
No. 90/000,932, Jan. 6, 1986

Reexamination Certificate for:
Patent No.: 3,958,888
Issued: May 25, 1976
Appl. No.: 471,156
Filed: May 17, 1974

[30]  Foreign Application Priority Data

May 17, 1973 [DE]  Fed. Rep. of Germany ....... 2324916
Jul. 13, 1973 [DE]  Fed. Rep. of Germany ....... 2329940

[51] Int. Cl.⁴ ............................. F16D 1/06; B25G 3/20
[52] U.S. Cl. ....................................... 403/13; 403/370

[58] Field of Search ............................. 403/369–371, 403/13, 16

[56]  References Cited

U.S. PATENT DOCUMENTS 3,717,367  2/1973  Peter et al. .................. 287/52.06

FOREIGN PATENT DOCUMENTS 2017149  10/1971  Fed. Rep. of Germany .
2137313   9/1972  Fed. Rep. of Germany .
7207814  11/1972  Fed. Rep. of Germany .

*Primary Examiner*—Andrew V. Kundrat

[57]  ABSTRACT

A clamping assembly mounting a cylindrically bored hub onto a shaft in which a double-taper ring and two self-locking tapered clamping sleeves are clamped together by means of axially oriented clamping bolts, the double-taper ring having a peripheral collar between the clamping sleeves for engagement by the clamping bolt, when the sleeves are to be unclamped from the double-taper ring.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-6 is confirmed.

* * * * *